(12) United States Patent
Dorward

(10) Patent No.: US 8,774,631 B2
(45) Date of Patent: Jul. 8, 2014

(54) SWITCH NODE

(75) Inventor: Richard Munro Dorward, Conventry (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 677 days.

(21) Appl. No.: 13/059,267

(22) PCT Filed: Aug. 20, 2008

(86) PCT No.: PCT/EP2008/060893
§ 371 (c)(1),
(2), (4) Date: Mar. 28, 2011

(87) PCT Pub. No.: WO2010/020279
PCT Pub. Date: Feb. 25, 2010

(65) Prior Publication Data
US 2011/0182302 A1 Jul. 28, 2011

(51) Int. Cl.
*H04J 14/02* (2006.01)
(52) U.S. Cl.
USPC ................................. 398/82; 398/48; 398/72
(58) Field of Classification Search
USPC .................................... 398/48–51, 83, 70–72
See application file for complete search history.

(56) References Cited

U.S. PATENT DOCUMENTS

| | | | |
|---|---|---|---|
| 5,953,141 A * | 9/1999 | Liu et al. ........................ | 398/83 |
| 6,240,222 B1 | 5/2001 | Bergmann | |
| 8,126,330 B2 * | 2/2012 | Wisseman ...................... | 398/83 |
| 2006/0098981 A1 * | 5/2006 | Miura et al. ................... | 398/45 |
| 2008/0181605 A1 * | 7/2008 | Palacharla et al. ............. | 398/50 |
| 2009/0041457 A1 * | 2/2009 | Maki et al. ..................... | 398/45 |
| 2009/0232497 A1 * | 9/2009 | Archambault et al. ......... | 398/50 |

FOREIGN PATENT DOCUMENTS

| | | |
|---|---|---|
| EP | 1 657 953 | 5/2006 |
| WO | 2008/031452 | 3/2008 |

OTHER PUBLICATIONS

International Search Report for PCT/EP2008/060893, mailed May 20, 2009.

* cited by examiner

*Primary Examiner* — Leslie Pascal
(74) *Attorney, Agent, or Firm* — Nixon & Vanderhye, P.C.

(57) ABSTRACT

A non-blocking telecommunications node comprising a plurality of ports. Each port adapted to pass telecommunications traffic comprising multiplexed signals. Each port is adapted to receive an incoming multiplexed signal comprising a plurality of component signals each having a predetermined wavelength. The node includes a plurality of transponders each arranged to receive a component signal. The plurality of transponders are arranged and connected to the ports such that each instance of a component signal having a specific wavelength received by each of the ports can be received simultaneously by the transponders. A node for adding component signals to an outgoing multiplexed signal is also disclosed.

6 Claims, 3 Drawing Sheets

SWITCH NODE

This application is the U.S. national phase of International Application No. PCT/EP2008/060893, filed 20 Aug. 2008 which designated the U.S. the entire contents of which is hereby incorporated by reference.

TECHNICAL FIELD

This invention relates to a telecommunications node and, in particular, an optical switch telecommunications node comprising a reconfigurable optical add/drop multiplexer. This invention also relates to a telecommunications network comprising the telecommunications node.

BACKGROUND

Known telecommunications networks operating using Wavelength Division Multiplexing include nodes to add or drop optical signals to or from the network. Such a node typically has two or more line directions for routing traffic. An optical cross connection within the node allows individual wavelengths carrying traffic to be routed on these different line directions. These known cross connections can also selectively terminate wavelengths.

A known reconfigurable optical add/drop multiplexer is shown in FIG. 1. A three-port optical add-drop node is shown generally designated 80. The device comprises a first port 12, a second port 14 and a third port 82 all in communication with one another. The three ports 12, 14, 82 share one multiplexer/demultiplexer module 42 having one bank of transponders 44. Thus, the ROADM can direct the components of the multiplexed signals between each of the ports and can drop selected components to the bank of transponders as well as add components. The first incoming signal 16 is split into three secondary signals 24, 34, 84 by the splitter 17. Each of these three signals 24, 34, 84 are substantially identical and continue on to a respective blocker 26, 46, 86 which can pass the signal 24, 34, 84 on command. A second incoming multiplexed signal 48 to the first port 12 is split into three secondary signals 50, 52, 87 by the splitter 54. The secondary signals 50, 52, 87 are substantially identical and continue on to respective blockers 56, 58, 88 which can selectively block the secondary signals on command. A third incoming signal 90 to the third port 82 is shown, which is split into three secondary signals 92, 94, 96 by a splitter 98. The secondary signals 92, 94, 96 are substantially identical. Each of the secondary signals 92, 94, 96 continues on to a respective blocker 10, 2, 4 which can pass the signal on command.

The three blockers 46, 56, 2 are then operated to selectively block two of the secondary signals 34, 52, 94. In this way only one of the signals 34, 52, 94 is passed to a shared splitter 60 which then passes the signal on to the shared multiplexer/demultiplexer 42 to be terminated at the shared transponders 44. The wavelengths of the secondary signal 24, 84, 50, 87, 92 or 96 that are not dropped by the transponders 44 are then allowed to pass through either of the blockers 26, 86, 58, 88, 10 or 4 respectively.

In a similar manner any new signals 62 added to the node 80 via the transponders 44 are first combined at the shared multiplexer/demultiplexer 42 and then passed to the shared splitter 60. The shared splitter 60 then splits the new signal 62 into three substantially identical secondary signals 64, 66, 6 which each continue on to a respective blocker 68, 70, 8. Depending on whether the new signal 62 is destined for the first port 12, or the second port 14, or the third port 82, the blockers 68, 70, 8 are then operated to selectively block two of the signals 64, 66, 6.

The architecture of this known node 80 permits the bank of transponders 44 to be shared by the three ports 12, 14, 82 for dropping and adding telecommunications traffic to and from the node 80. By activation of the blockers 26, 46, 56, 58, 68, 70, 86, 88, 10, 2, 4, 8 any one of the shared transponders 44 can selectively address either of the line directions. This is particularly advantageous due to the fact that, in practice, reconfigurable optical add/drop multiplexers are very costly due to the number of components from which they comprise.

Thus, the reconfigurable optical add/drop multiplexer of FIG. 1 utilises a combination of splitters and blockers to control the flow of traffic through the node. Alternatively, wavelength selective switches can be used instead of the splitter and blocker arrangement. This is advantageous as a wavelength selective switch has the means to selectively send signals to each of its outputs, as will be known to those skilled in the art. This reduces the number of components and optical fibre interconnections required.

SUMMARY

According to a first aspect of the invention we provide a telecommunications node comprising a plurality of ports. Each is port adapted to pass telecommunications traffic comprising multiplexed signals. Each port is adapted to receive an incoming multiplexed signal comprising a plurality of component signals each having a predetermined wavelength. The node includes a plurality of transponders each arranged to receive a component signal of the multiplexed signals received at the plurality of ports. The plurality of transponders are arranged and connected to the ports such that each instance of a component signal having a specific wavelength received by each of the ports can be received simultaneously by the transponders.

This is advantageous as the telecommunications node is flexible and allows any combination of wavelength component signals received on any of the ports to be dropped to the transponders and processed as required. For example, the node of the invention is able to drop a component signal received at each of the ports to the transponders simultaneously, wherein each of those component signals has the same wavelength. The node of the invention is thus "non-blocking".

The plurality of transponders may also each be arranged to supply a component signal of the multiplexed signals to be sent at the plurality of ports, each port being adapted to send an outgoing multiplexed signal comprising a plurality of component signals each having a predetermined wavelength and the plurality of transponders are arranged and connected to the ports such that each of the ports can simultaneously receive from the transponders an individual instance of a component signal having a specific wavelength.

According to a second aspect of the invention we provide a telecommunications node comprising a plurality of ports, each port adapted to pass telecommunications traffic comprising multiplexed signals. The node includes a plurality of transponders each arranged to supply a component signal of the multiplexed signals to be sent at the plurality of ports. Each port is adapted to send an outgoing multiplexed signal comprising a plurality of component signals each having a predetermined wavelength. The plurality of transponders are arranged and connected to the ports such that each of the ports can simultaneously receive from the transponders an individual instance of a component signal having a specific wavelength.

This is advantageous as the telecommunications node is flexible and allows any combination of wavelength component signals to be added by the transponders and sent to any of the ports. For example, the node of the invention is able to add a component signal to be sent from each of the ports simultaneously, wherein each of those component signals has the same wavelength. The node of the invention is thus "non-blocking".

Each port may be also adapted to receive an incoming multiplexed signal comprising a plurality of component signals each having a predetermined wavelength, the plurality of transponders each arranged to receive a component signal of the multiplexed signals received at the plurality of ports, the plurality of transponders arranged and connected to the ports such that each instance of a component signal having a specific wavelength received by each of the ports can be received simultaneously by the transponders.

The node may include a plurality of interface elements arranged between the ports and the transponders for passing signals between the ports and the transponders. The interface elements may be arranged to receive signals from each and every port and to pass an internal multiplexed signal to the transponders along an internal multiplexed signal line. The interface elements may be arranged to receive an internal multiplexed signal from the transponders along an internal multiplexed signal line and arranged to be able to pass signals to each and every port.

The node may include at least the same number of interface elements as ports. This provides a configuration in which component signals having a common wavelength received on all of the ports can be dropped to the transponders simultaneously. Equally, this configuration allows the transponders to simultaneously send individual signals having a common wavelength to all of the ports. In particular, the node may include at least the same number of internal multiplexed signal lines as ports.

The node may include a plurality of drop demultiplexers each of which is associated with a bank of the transponders, the transponders arranged to drop traffic received by the ports, the drop demultiplexers arranged to separate the internal multiplexed signal into its constituent wavelength component signals for receipt by the bank of transponders. The node may include a plurality of add multiplexers each of which is associated with a bank of the transponders, the transponders arranged to add traffic for sending by the ports, the add multiplexers arranged to form an internal multiplexed signal from constituent wavelength component signals from the bank of transponders. Each drop demultiplexer and add multiplexer may be associated with a respective interface element.

Each port may comprise an inbound device arranged to receive the incoming multiplexed signal, and an outbound device arranged to pass an outgoing multiplexed signal, wherein at least one of the inbound device and outbound device is a wavelength director device, the wavelength director device arranged to select a component signal of the incoming multiplexed signal and direct it to one of the drop demultiplexers or one of the other ports or, accordingly, form the outgoing multiplexed signal from selected signals received from the add multiplexers or other ports. This is advantageous as the ports of the node can select and direct the appropriate signals between the ports and to/from one of the drop demultiplexers/add multiplexers via the appropriate interface element.

The wavelength director device may be a wavelength selective switch. This is advantageous as wavelength selective switches keep the interconnections between devices in the node to a minimum.

According to a third aspect of the invention we provide a network including a telecommunications node of the first aspect of the invention.

The network of the third aspect of the invention is advantageous as an administrator has full flexibility over which component signals are dropped and which are passed through the nodes of the network.

BRIEF DESCRIPTION OF THE DRAWINGS

There now follows by way of example only a detailed description of the present invention with reference to the accompanying drawings in which.

DETAILED DESCRIPTION

Figure 1:
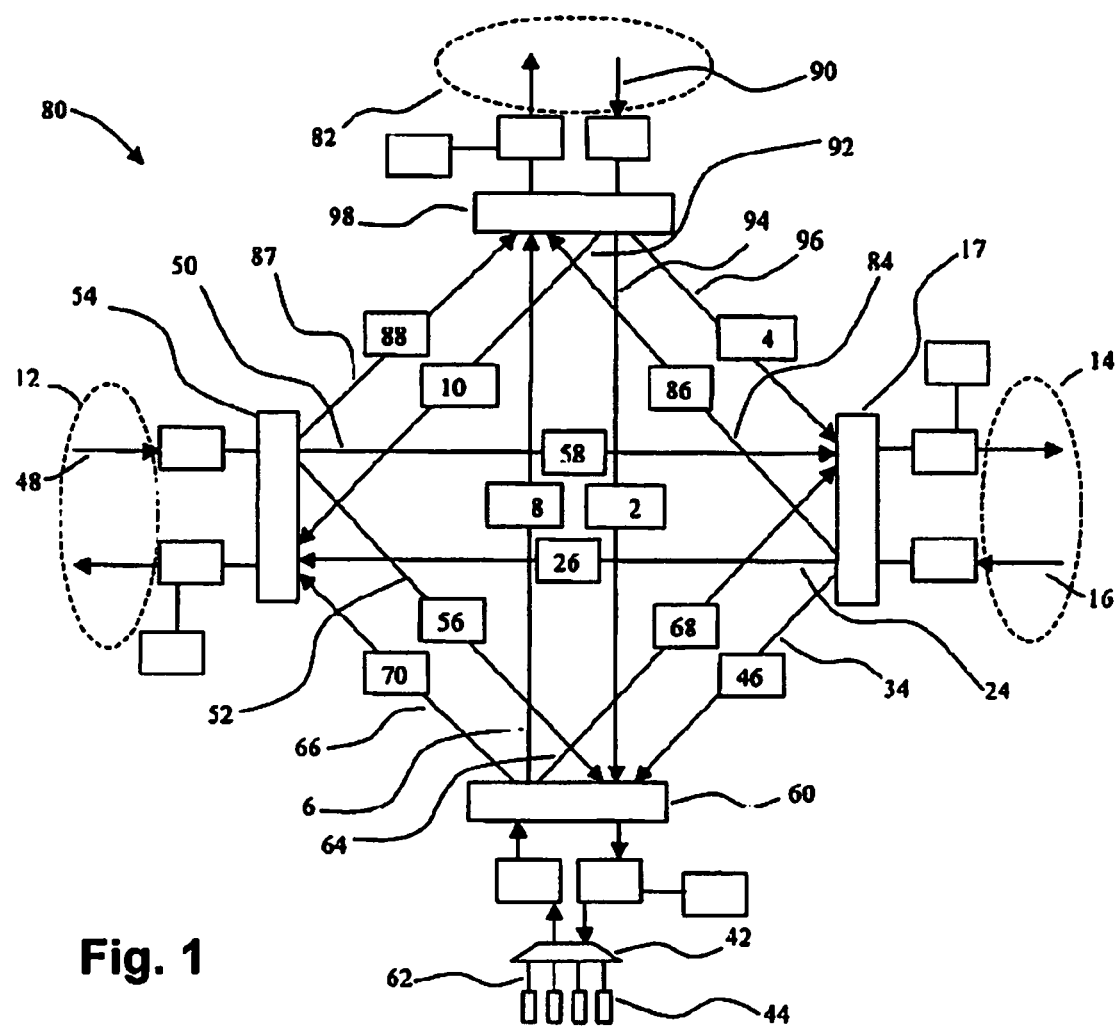
FIG. 1 shows an optical add/drop multiplexer of the prior art.

Optical switch nodes are required, for example, to direct optical traffic along various fibre optic communication lines. Thus, a plurality of communication lines, which typically carry multiplexed signals, are connected to ports of the switch node. The node is configured to direct the component signals of the multiplexed signals from one communication line to another as required. Switch nodes are also used to add optical traffic and drop optical traffic from the ports for electrical processing, such as reshaping or any other purpose.

An embodiment of a telecommunications node is shown generally as 100. The node 100 comprises a plurality of ports 101, 102, 103, which pass telecommunications traffic on communication lines 110, 111, 112. The node 100 also includes a plurality of drop demultiplexers 114, 116, 118 that are each connected to a respective bank of transponders 126, 127, 128 and receive signals from an internal multiplexed signal line 140, 141, 142.

Associated with each of the drop demultiplexers is an add multiplexer 113, 115, 117, which receives signals from the bank of transponders 126, 127, 128 to add to the internal multiplexed signal line 140, 141, 142. The drop demultiplexers 114, 116, 118 and their associated add multiplexers 113, 115, 117 form a set of mux/demux pairs 130, 131, 132. The mux/demux pairs 130, 131, 132 may be embodied as a pair of wavelength selective switches or as a wavelength selective switch and splitter/combiner. Further, it will be appreciated that the mux/demux pairs 130, 131, 132 may each be embodied as a plurality of cascading multiplexing components and cascading demultiplexing components. This enables components having limited fan-out to completely decompose or assemble a multiplexed signal. Alternatively, drop demultiplexers 114, 116, 118 may comprise fixed demultiplexers or a splitter and blocker assembly or a series of fixed or tuneable filters. Alternatively, the add multiplexers 113, 115, 117 may comprise a fixed multiplexer or a combiner and blocker assembly or a series of fixed or tuneable filters.

Interface elements 133, 134, 135 connect the mux/demux pairs 130, 131, 132 to the ports 101, 102, 103. The interface elements 133, 134, 135 each comprise an interface multiplexer 120, 122, 124 and an interface demultiplexer 121, 123, 125. The interface multiplexer 120, 122, 124 and interface demultiplexer 121, 123, 125 may each be embodied as a wavelength selective switch. Alternatively, one of them may be a splitter/combiner and the other a wavelength selective switch. The interface elements 133, 134, 135 connect to the mux/demux pairs 130, 131, 132 via the internal multiplexed signal lines 140, 141, 142.

Each of the ports 101, 102, 103 comprises an inbound device and an outbound device. The inbound device 104, 106, 108 comprises a demultiplexer formed by a wavelength selective switch. The outbound device 105, 107, 109 comprises a multiplexer also formed by a wavelength selective switch. The plurality of outputs from each of the inbound devices 104, 106, 108 connect the port 101, 102, 103 to every other port and each of the interface elements 133, 134, 135. In particular, each inbound device 104, 106, 108 connects its respective port 101, 102, 103 to each of the interface element multiplexers 120, 122, 124. Similarly, each outbound device 105, 107, 109 connects its associated port 101, 102, 103 to each of the interface element demultiplexers 121, 123, 125. Further, each inbound device 104, 106, 108 connects its associated port to the outbound device 105, 107, 109 of every other port 101, 102, 103.

Alternatively, if the ports 101, 102, 103 use wavelength selective devices for both the inbound device and outbound device, then the interface multiplexers and interface demultiplexers can be splitters and combiners respectively. Thus, the node 100 will have the required degree of flexibility provided that all paths between the external communication lines 110, 111, 112 (via the ports) or between the external communication lines and internal multiplexed signal lines 140, 141, 142 include at least one wavelength selective device.

Thus, a signal received on line 110 by port 101 can be directed by inbound device 104 to the outbound device 107 of port 102, the outbound device 109 of port 103 or the internal multiplexers 120, 122, 124 of the interface elements 133, 134, 135. Likewise, a signal to be sent along line 110 from the outbound device 105 can be received from the inbound device 106 of port 102, the inbound device 108 of port 103 or the internal demultiplexers 121, 123, 125 of the interface elements 133, 134, 135.

A wavelength selective switch is able to select individual wavelength components of a multiplexed signal and direct them to a particular output of the switch. They can also, when operating in the reverse direction, select components to form the multiplexed signal. It will be appreciated that the wavelength selective switch multiplexers and demultiplexers may be replaced with multiplexers and demultiplexers based on a combiner/splitter and blockers, as will be known to those skilled in the art.

Figure 2:
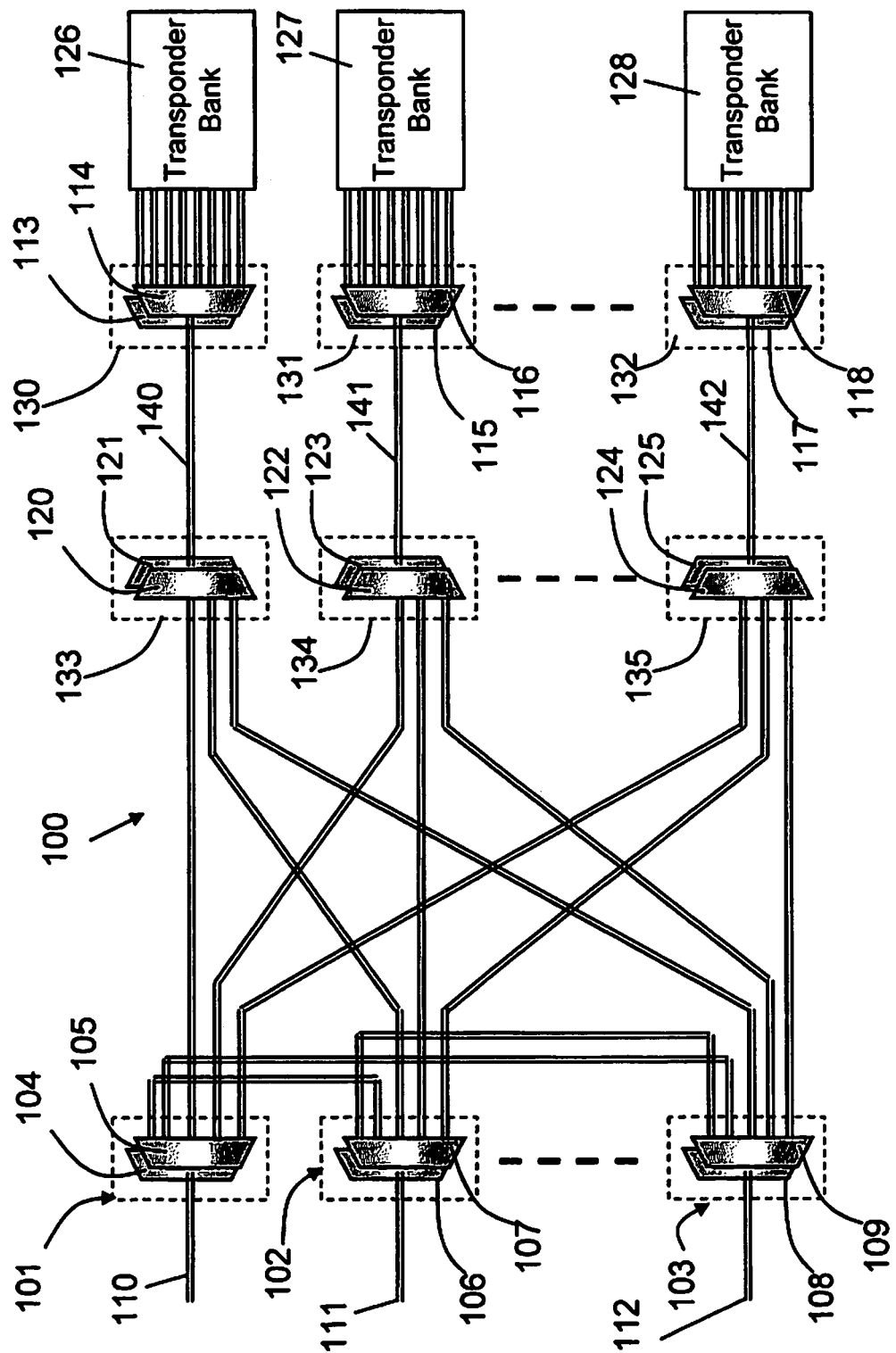
FIG. 2 shows an embodiment of a telecommunications node according to the invention.
Figure 3:
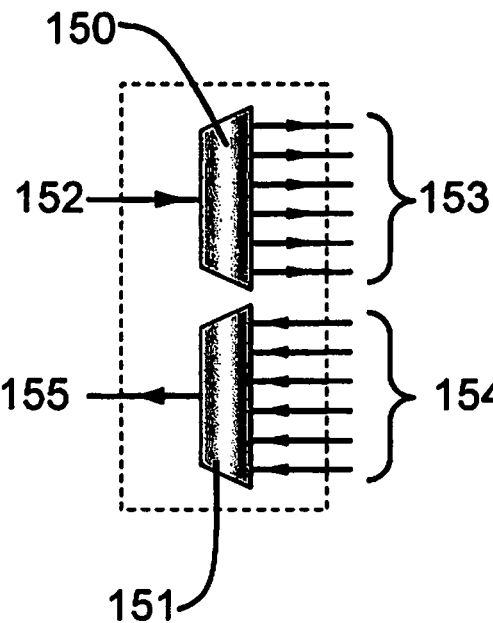
FIG. 3 shows a first embodiment of a port of the telecommunications node shown in FIG. 2.
Figure 4:
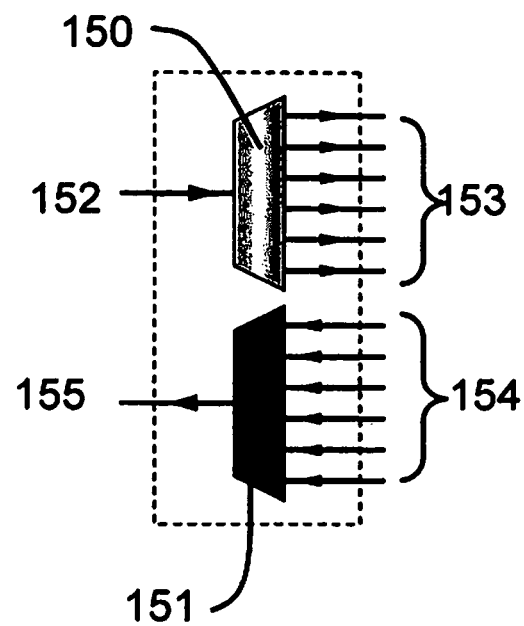
FIG. 4 shows a second embodiment of a port of the telecommunications node shown in FIG. 2.
Figure 5:
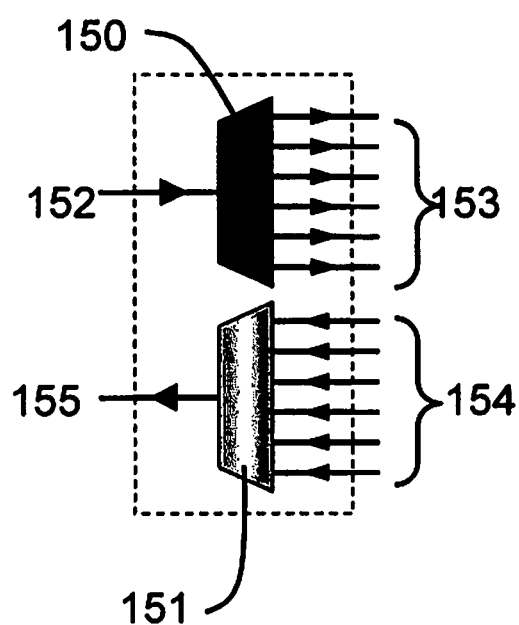
FIG. 5 shows a third embodiment of a port of the telecommunications node shown in FIG. 2.

Examples of different port 101, 102, 103 configurations are shown in FIGS. 3, 4 and 5. FIG. 3 shows both the inbound device 150 and outbound device 151 as wavelength selective switches. This is the configuration used in the embodiment of FIG. 2. The inbound device has a single input 152 and a plurality of outputs 153. In this example six outputs are shown. The outbound device has a plurality of inputs 154, in this case six, and a single output 155.

FIG. 4 shows the inbound device 150 comprising a wavelength selective switch and the outbound device 151 comprising a combiner. The combiner receives a plurality of component wavelength signals and combines them into a single multiplexed outgoing signal. This may be achieved by using the selective capabilities of the wavelength selective switch inbound devices 104, 106, 108 where the signals are directed between ports 101, 102, 103, or the selective capabilities of the interface elements 133, 134, 135 when they comprise wavelength selective switches.

FIG. 5 shows the outbound device 151 comprising a wavelength selective switch and the inbound device 150 comprising a splitter. The splitter receives a single multiplexed incoming signal and splits it into a plurality of multiplexed signals. As the splitter 150 will send the incoming multiplexed signal to all of the outputs 153, the selection of the appropriate wavelength components of the incoming multiplexed signal is dealt with at the interface elements 133, 134, 135 and the outbound device 105, 107, 109, where they comprise wavelength selective switches.

It is advantageous for either the inbound devices 104, 106, 108 or the interface multiplexers 120, 122, 124 to comprise wavelength selective devices while the other components comprise a splitter or combiner as appropriate. This configuration allows the node to be easily reconfigured. Further, it is advantageous for either the outbound devices 105, 107, 109 or the interface demultiplexers 121, 123, 125 to comprise wavelength selective devices while the other components comprise a splitter or combiner as appropriate. The wavelength selective device is typically a wavelength selective switch. However, in the present embodiment of FIG. 2 all of these components are wavelength selective switches.

The drop demultiplexers 114, 116, 118 comprise wavelength selective devices, which in this embodiment are wavelength selective switches. However, it will be appreciated that the drop demultiplexers 114, 116, 118 may comprise a fixed demultiplexer or a splitter and blocker assembly or a series of fixed or tuneable filters. The configuration of these alternative components will be readily appreciated by those skilled in the art and will not be discussed further herein. The add multiplexer 113, 115, 117 comprises a wavelength selective switch in the embodiment of FIG. 2, although it may comprise a passive combiner or a fixed wavelength multiplexer or a series of fixed or tuneable filters.

The signal of line 110 is wavelength division multiplexed and comprises component wavelengths $\lambda_1$, $\lambda_2$ and $\lambda_3$ of predefined wavelengths. The signals of lines 111 and 112 are also wavelength division multiplexed and comprise component wavelengths $\lambda_1$, $\lambda_2$ and $\lambda_3$ of the same wavelengths. In the following example, the incoming multiplexed signal on line 110 is to have component wavelength $\lambda_1$ sent to port 102, component wavelength $\lambda_2$ sent to port 103 and component wavelength $\lambda_3$ dropped to the banks of transponders 126, 127, 128. The incoming multiplexed signal on line 111 is to have component wavelength $\lambda_1$ sent to port 103, component wavelength $\lambda_2$ sent to port 101 and component wavelength $\lambda_3$ dropped to the banks of transponders 126, 127, 128. The incoming multiplexed signal on line 112 is to have component wavelength $\lambda_1$ sent to port 101, component wavelength $\lambda_2$ sent to port 102 and component wavelength $\lambda_3$ dropped to the banks of transponders 126, 127, 128.

Thus, three instances of $\lambda_3$, received at each of the ports 101, 102, 103, are required to be dropped. The inbound devices 104, 106, 108 are therefore each configured to direct $\lambda_3$ to a different interface element 133, 134, 135. Accordingly the interface element 133, 134, 135 can pass the signal to its respective mux/demux pair 130, 131, 132 and on to the transponders 126, 127, 128. The node 100 is able to achieve this level of flexibility as the banks of transponders 126, 127, 128 are arranged such that they can receive the same number of instances of a wavelength component via the interface elements as there are ports 101, 102, 103. Thus, this arrangement is "non-blocking".

Further, it will be appreciated that this configuration leads to similar flexibility in the "add" direction. Thus, as will be apparent to those skilled in the art, the banks of transponders 126, 127, 128 are able to send three instances of $\lambda_3$ (in this example) for adding to the outgoing signals at the ports 101, 102, 103. Thus, it may be required that the transponder banks 126, 127 and 128 send three individual instances of $\lambda_3$ for adding to signal lines 110, 111, 112 from the ports 101, 102, 103. The instance of $\lambda_3$ from transponder bank 126 is to be directed to port 101, the instance from transponder bank 127 is to be directed to port 102 and the instance from transponder bank 128 is to be directed to port 103. Accordingly these instances of $\lambda_3$ are sent to the add multiplexers 113, 115, 117 for passing along the multiplexed signal lines 140, 141 and 142. The internal demultiplexers 121, 123, 125 then direct the signals from their respective internal multiplexed signal lines 140, 141, 142 to the appropriate port 101, 102, 103. Therefore, each outbound device 105, 107, 109 of the ports is able to simultaneously receive an individual instance of $\lambda_3$ for adding to the outgoing traffic on lines 110, 111, 112.

It will be appreciated that the multiplexers and demultiplexers 104, 105, 106, 107, 108, 109, 113, 114, 115, 116, 117, 118, 120, 121, 122, 123, 124, 125 used in the embodiment may be embodied as components other than wavelength selective switches or combinations of wavelength selective switches and splitters and combiners. For example, the multiplexing and demultiplexing functions of the wavelength selective switches may be realised by splitters and blockers, as will be readily envisaged by those skilled in the art once given the configuration of FIG. 2.

The invention claimed is:

1. A telecommunications node comprising a plurality of ports, each port adapted to pass telecommunications traffic comprising multiplexed signals,
   the node including a plurality of transponders each arranged to supply a component signal of the multiplexed signals to be sent at the plurality of ports;
   each port being adapted to send an outgoing multiplexed signal comprising a plurality of component signals each having a predetermined wavelength;
   wherein the plurality of transponders are arranged and connected to the ports such that each of the ports can simultaneously receive from the transponders an individual instance of a component signal having a specific wavelength;
   each port being also adapted to receive an incoming multiplexed signal comprising a plurality of component signals each having a predetermined wavelength, the plurality of transponders each arranged to receive a component signal of the multiplexed signals received at the plurality of ports, the plurality of transponders arranged and connected to the ports such that each instance of a component signal having a specific wavelength received by each of the ports can be received simultaneously by the transponders; and
   the node including a plurality of interface elements arranged between the transponders and the ports for passing signals therebetween;
   each interface element being arranged to receive signals from each and every port and to pass an internal multiplexed signal to the transponders along an internal multiplexed line; and
   the interface elements being arranged to receive an internal multiplexed signal from the transponders along an internal multiplexed signal line and arranged to be able to pass signals to each and every port;
   wherein the node includes the same number of interface elements as ports, and the node includes the same number of internal multiplexed signal lines as ports.

2. A telecommunications node according to claim 1, in which the node includes a plurality of drop demultiplexers each of which is associated with a bank of the transponders, the transponders arranged to drop traffic received by the ports, the drop demultiplexers arranged to separate a multiplexed signal into its constituent wavelength component signals for receipt by their associated bank of transponders.

3. A telecommunications node according to claim 1, in which the node includes a plurality of add multiplexers each of which is associated with a bank of the transponders, the transponders arranged to add traffic for sending by the ports, the add multiplexers arranged to form an internal multiplexed signal from constituent wavelength component signals from the bank of transponders.

4. A telecommunications node according to claim 2, in which each drop demultiplexer is associated with a respective interface element.

5. A telecommunications node according to claim 3, in which each add multiplexer is associated with a respective interface element.

6. A telecommunications node according to claim 1, in which each port comprises an inbound device arranged to receive the incoming multiplexed signal, and an outbound device arranged to pass an outgoing multiplexed signal, wherein at least one of the inbound device and outbound device is a wavelength director device, the wavelength director device arranged to select a component signal of the incoming multiplexed signal and direct it to one of the drop demultiplexers or one of the other ports or, accordingly, form the outgoing multiplexed signal from selected signals received from the add multiplexers or other ports.

* * * * *

UNITED STATES PATENT AND TRADEMARK OFFICE
CERTIFICATE OF CORRECTION

| | | |
|---|---|---|
| PATENT NO. | : 8,774,631 B2 | Page 1 of 1 |
| APPLICATION NO. | : 13/059267 | |
| DATED | : July 8, 2014 | |
| INVENTOR(S) | : Dorward | |

It is certified that error appears in the above-identified patent and that said Letters Patent is hereby corrected as shown below:

On the Title Page, in Item (75), under "Inventor", in Column 1, Line 1, delete "Conventry" and insert -- Coventry --, therefor.

Signed and Sealed this
Fourteenth Day of October, 2014

Michelle K. Lee
*Deputy Director of the United States Patent and Trademark Office*